United States Patent
Wong

(10) Patent No.: US 7,141,222 B2
(45) Date of Patent: Nov. 28, 2006

(54) TURBINE-BOOSTED PHOTOCATALYSIS FLUID PROCESSOR

(76) Inventor: Tommy Chi-Kin Wong, RM1901, Win Century Centre 2A Mongkok Rd., Kowloon (HK)

( * ) Notice: Subject to any disclaimer, the term of this patent is extended or adjusted under 35 U.S.C. 154(b) by 708 days.

(21) Appl. No.: 10/423,897

(22) Filed: Apr. 28, 2003

(65) Prior Publication Data

US 2004/0213710 A1 Oct. 28, 2004

(51) Int. Cl.
*B01J 19/08* (2006.01)
(52) U.S. Cl. .................................. 422/186.3; 250/431
(58) Field of Classification Search ............. 422/186.3; 250/431
See application file for complete search history.

(56) References Cited

U.S. PATENT DOCUMENTS 4,892,712 A * 1/1990 Robertson et al. .......... 422/186
6,117,337 A * 9/2000 Gonzalez-Martin et al. 210/748
6,431,528 B1 * 8/2002 Kojima ...................... 261/79.2
6,657,205 B1 * 12/2003 Wong ......................... 250/438

FOREIGN PATENT DOCUMENTS

EP 0982572 A1 * 1/2000

* cited by examiner

*Primary Examiner*—Kishor Mayekar
(74) *Attorney, Agent, or Firm*—Rabin & Berdo P.C.

(57) ABSTRACT

A turbine-boosted photocatalysis fluid processor that makes the fluid that flows inside form a high-speed whirlpool so as to enhance both the sterilization effect of the ultraviolet-radiation and the photocatalysis effect. The high-speed whirlpool also improves the degradation of organic contaminants and reduces the frequency maintenance of the quartz sleeve. The ultraviolet-radiation indicator and the color scale with different shades of colors positioned together are convenient for users to measure the intensity of the ultraviolet-radiation so as to avoid the loss of effectiveness of the photocatalysis fluid processor caused by aging or damage of the ultraviolet-radiation lamp.

13 Claims, 5 Drawing Sheets

TURBINE-BOOSTED PHOTOCATALYSIS FLUID PROCESSOR

BACKGROUND OF THE INVENTION (a) Field of the Invention

The present invention relates to a photocatalysis fluid processor, especially to a turbine-boosted photocatalysis fluid processor that makes the fluid flow inside form a whirlpool spinning at a high speed so as to improve both the sterilization effect of the ultraviolet-radiation and the photocatalysis effect.

(b) Description of the Prior Art

A common ultraviolet-radiation lamp processor or photocatalysis fluid processor has an ultraviolet-radiation lamp installed inside a quartz sleeve. The inner surface of the tube being illuminated is coated with a layer of photocatalyst. The amount of the fluid flowing through the tube depends on the total energy of the ultraviolet radiation emitted from the lamp and the total area of the surface of the tube coated with photocatalyst. When a fluid flows through the tube, the ultraviolet light radiates the organism inside the fluid and kills them directly or by reacting with the photocatalyst, free radicals such as OH radicals are produced for photocatalysis so as to degrade organic pollutants.

The structure of the conventional tube unit is only a tube through which fluid flows. When the fluid flow directly passes through the interior, the flow rate of the fluid is inconsistent due to the restriction of the flow amount. Owing to the inconsistency of the fluid flow rate, the slow-flowing fluid inside the tube unit is not blended properly, resulting in inconsistent exposure time of ultraviolet radiation and photocatalysis while the fluid is being processed. Moreover, when the fluid passes by the tube unit, the cross-sectional area of passage is larger than the cross-sectional area of the fluid inlet tube, so the flow rate is slowed, resulting in accumulation of dirt onto the wall of the quartz sleeve. Thus the penetration of the ultraviolet-radiation is obstructed and reduced while the total energy of ultraviolet radiation absorbed by the photocatalyst is also decreased. Therefore the total efficiency is decreased. In addition, as the ultraviolet-radiation lamp ages, the intensity of the ultraviolet light emitted is unstable and can't be measured by the human eye, it can only be measured by expensive devices measuring the intensity of the ultraviolet light or by calculating the age of the ultraviolet-radiation lamp being used, in order to determine whether the photocatalysis fluid processor is working properly.

SUMMARY OF THE INVENTION

The main objective of the present invention is to provide a turbine-boosted photocatalysis fluid processor by which the fluid flowing into it forms a high-speed whirlpool even if the flow rate of fluid is restricted, enabling sufficient blending of the processed fluid, self-cleaning of the wall of the tube, and the uniform ultraviolet-radiation of the organisms in the fluid. Furthermore, the area of photocatalysis is also enlarged. In addition, the loss of effectiveness of the photocatalysis fluid processor due to the aging or damage of the ultraviolet-radiation lamp can be avoided.

In order to achieve the objective mentioned above and avoid the shortcomings of the prior art, the present invention includes a quartz sleeve installed inside a tube unit coated with photocatalyst on the inner side thereof. Inside the quartz sleeve is an ultraviolet-radiation lamp. At the upper and lower end of the tube unit is respectively a fluid inlet tube and a fluid outlet tube. The upper end of the tube unit with the fluid inlet tube can be separated with the tube unit coated with the photocatalyst. A speed-accelerating mechanism having a plurality of diversion channels is positioned on one end of the fluid inlet tube of the tube unit. The total area of a fluid outlet hole of the diversion channel is smaller than the cross-sectional area of the passage of the fluid inlet tube. Between the tube unit and the quartz sleeve, a plurality of photocatalysis-enhancing devices are positioned in parallel.

Compared with the prior art, fluid flowing through the present invention forms a whirlpool spinning at high speed so that the fluid being treated by photolysis is blended adequately, not only enhancing the efficiency of photocatalysis, sterilization and degradation of organic contaminants, but also reducing the maintenance frequency. The round shape of the photocatalysis-enhancing device increases the desired effect. The disadvantage of the frequent cleaning of the quartz sleeve in conventional units is also solved. In addition, on the connection part between the tube unit with the fluid inlet tube and the tube unit coated with phtotocatalyst, a circular lock is installed for the convenience of changing the direction of the fluid outlet during maintenance. As to the ultraviolet-radiation indicator, it converts the ultraviolet light to visible light without an outside power source for users to eye-measure the intensity of the ultraviolet light. Thus the loss of effectiveness the fluid processor caused by aging or damage to the ultraviolet-radiation lamp can be avoided.

By the present invention, a whirlpool spinning at a high speed is formed inside the photocatalysis-enhancing devices or between the quartz sleeve and the photocatalysis-enhancing device no matter whether the flow rate of the fluid is low or high. Thus the fluid for the sterilizing function can be blended properly and contact the photocatalyst on the inner wall of the tube unit and on the photocatalysis-enhancing devices equally so as to increase the degradation effect of photocatalysis. By a plurality of photocatalyst layers on different positions, the photocatalysis area is enlarged in order to achieve maximum effect. Therefore, the ultraviolet light radiates organisms inside the fluid being processed equally, thus enhancing the sterilizing effect. The shortcoming of the frequent cleaning of the quartz sleeve is also solved by the flushing effect of the high-speed whirlpool. The ultraviolet-radiation indicator is used to avoid the loss of effectiveness of the photocatalysis fluid processor caused by aging or damage to the ultraviolet-radiation lamp.

BRIEF DESCRIPTION OF THE DRAWINGS

The accomplishment of the above-mentioned object of the present invention will become apparent from the following description and its accompanying drawings which show by illustration the embodiment of the present inventions as follows.

DETAILED DESCRIPTION OF THE PREFERRED EMBODIMENT

Figure 1:
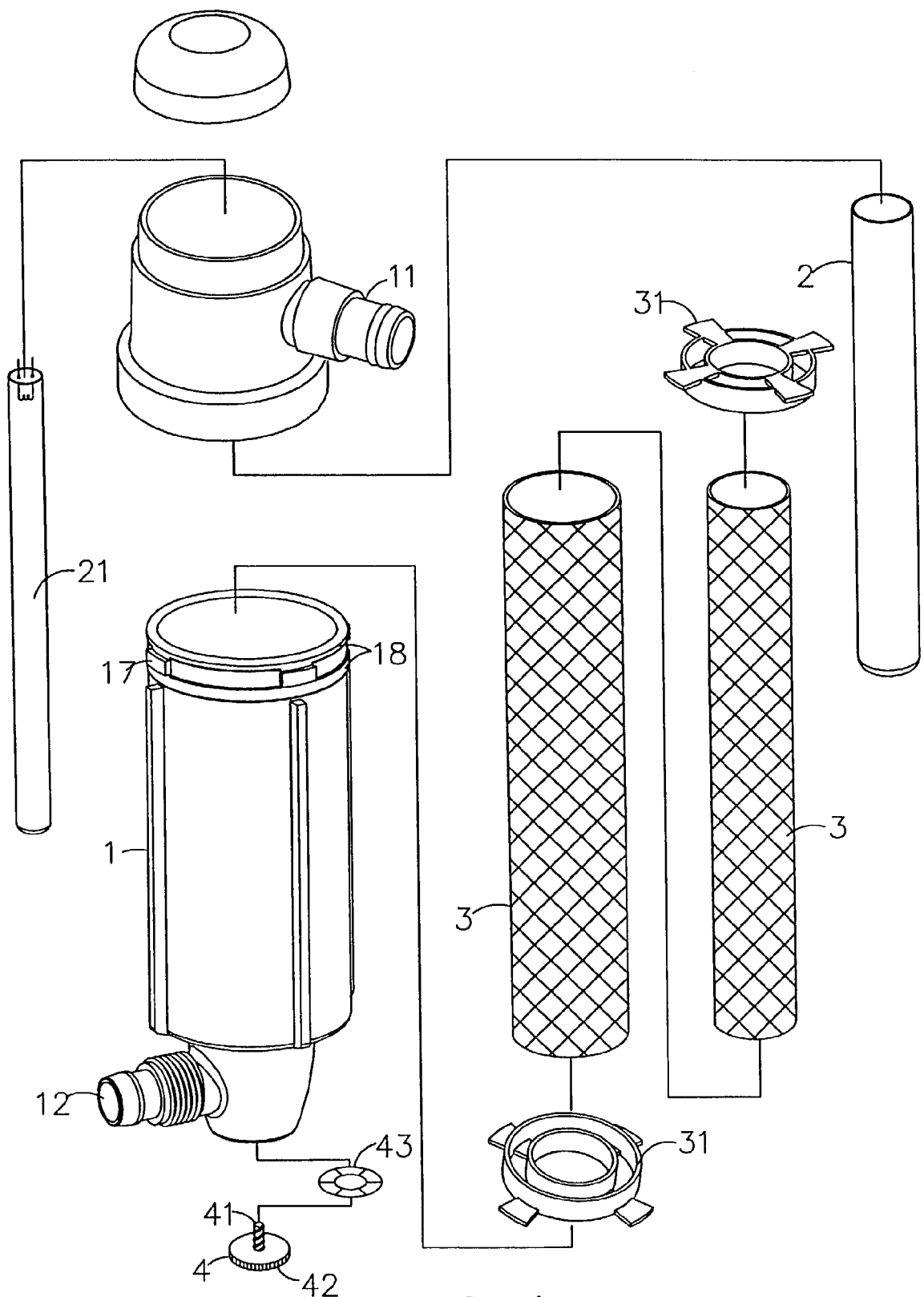
FIG. 1 is an explosive view of the present invention.
Figure 2:
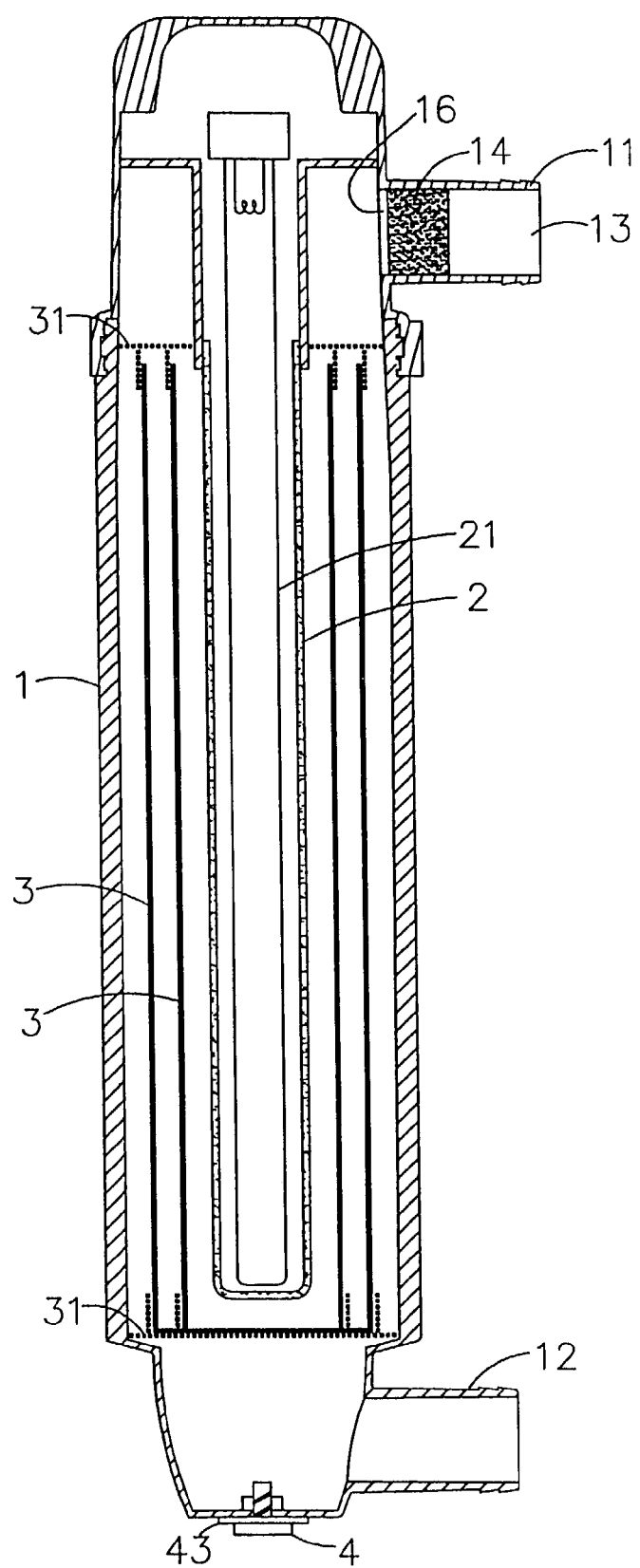
FIG. 2 is a cross-sectional view of the present invention when assembled.

Refer to FIG. 1 & FIG. 2, a turbine-boosted photocatalysis fluid processor includes a quartz sleeve 2 positioned inside a tube unit 1 coated with photocatalyst on the inner side thereof and an ultraviolet-radiation lamp 21 is installed inside the quartz sleeve 2. A plurality of photocatalysis enhancing devices 3 which are coated with the photocatalyst on the surface thereof, are positioned parallel between the tube unit 1 and the quartz sleeve 2. According to the different characteristics of the fluid being processed, various combinations of photocatalyst are coated on the photocatalysis-enhancing device 3. The chemical element of photocatalyst is a semiconductor material such as cadmium sulfide, iron oxide, molybdenum trioxide, titanium dioxide, tungsten trioxide, Zinc oxide ( Cds, Fe2O3, MoO3, TiO2, WO3, ZnO ) in nano-scale. On the top and the bottom of the photocatalysis-enhancing device 3, a fixing ring 31 is installed therein respectively. On the upper and lower ends of the tube unit 1, a fluid inlet tube 11 and a fluid outlet tube 12 are mounted therein respectively.

Figure 3:
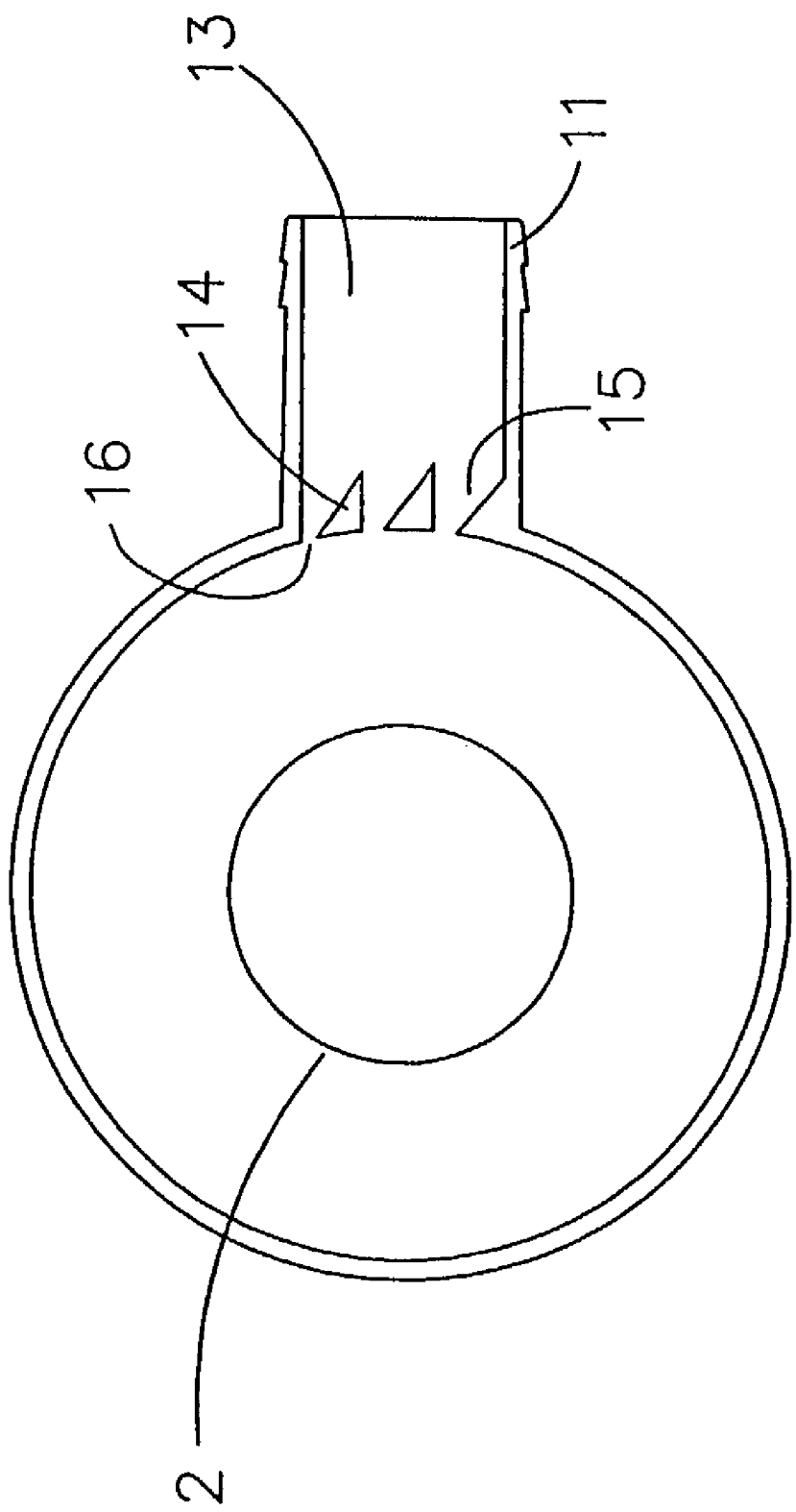
FIG. 3 is a transverse cross-sectional view of the diversion mechanism of the present invention.

A speed-accelerating mechanism 14, as shown in FIG. 3, is positioned on one end of the fluid inlet tube 11 of the tube unit 1. The speed-accelerating mechanism 14 is composed of a plurality of diversion channels 15 whose inclination angle (the angle between the center of the quartz sleeve 2 and the speed-accelerating mechanism 14) ranges from 91 to 179 degrees. The total area of a fluid outlet hole 16 of the diversion channels 15 is smaller than the cross-sectional area of the passage of the fluid inlet tube 11 so as to form a fluid-pressurizing chamber 13 on front side of the fluid inlet tube 11. Thus when the fluid flows through the diversion channels 15, the fluid is discharged from the fluid outlet hole 16 in a specific angle and at high speed. Then the fluid forms a whirlpool spinning at a high speed inside the photocatalysis-enhancing device 3, between the tube unit 1 and the photocatalysis-enhancing device 3, between the quartz sleeve 2 and the photocatalysis-enhancing device 3. Therefore, the fluid that needs photocatalysis can be blended properly. In the meantime, the fluid spinning at high speed flushes the wall of the quartz sleeve 2 thus reducing the need for frequent cleaning of the quartz sleeve 2.

Figure 5A:
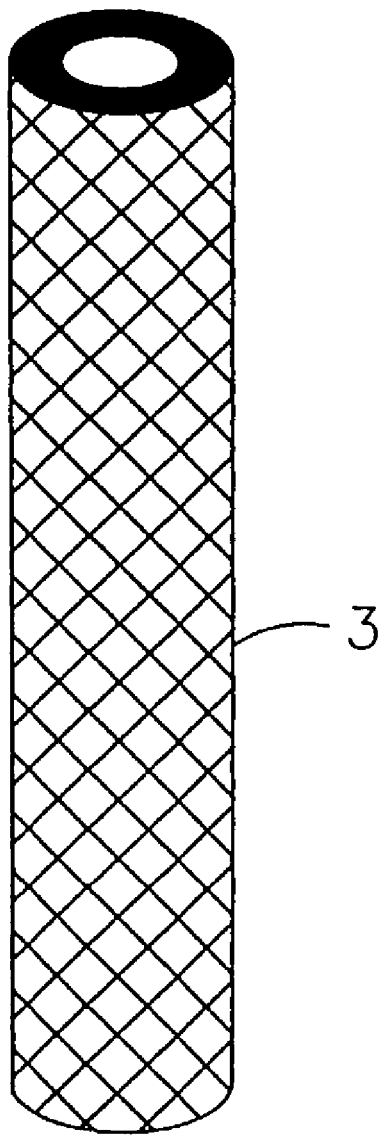
FIG. 5A is a schematic drawing of inner and outer wire-mesh tubes of a photocatalysis-enhancing device of the present invention.
Figure 5B:
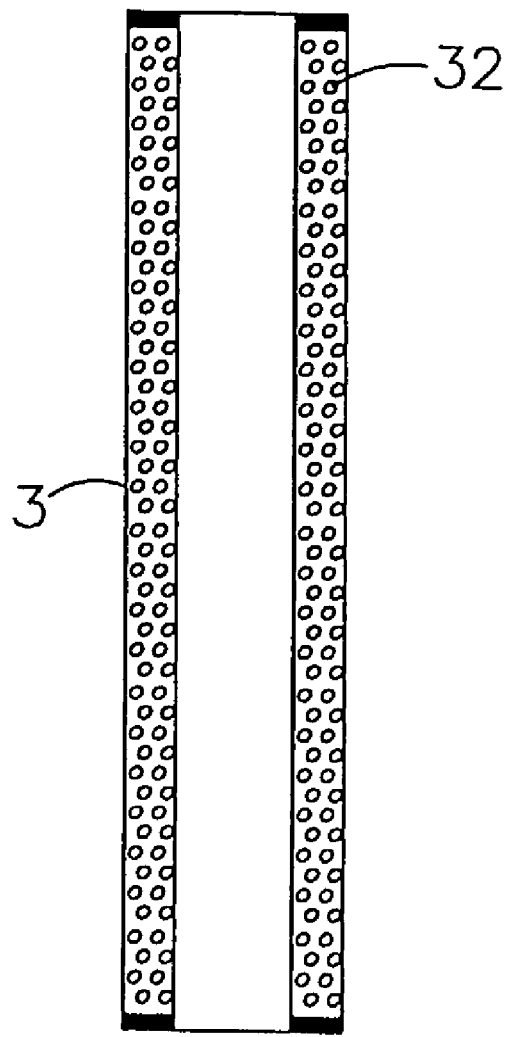
FIG. 5B is a cross-sectional view of the photocatalysis-enhancing device of the present invention.

The photocatalysis-enhancing devices 3 have a plurality of wires with photocatalyst, intercrossed into cylindroids (as shown in FIG. 5A). The photocatalysis-enhancing device 3 is a wire-mesh tube. The photocatalysis-enhancing device 3 can also be composed of an inner and an outer wire-mesh tube which are sealed on the top and the bottom side for accommodating granular carriers of photocatalyst 32 there between (as shown in FIG. 5B).

A four-direction circular lock 17 is positioned on the connection area between the upper side of the tube unit 1 with the fluid inlet tube 11 and the tube unit 1 coated with photocatalyst on the inner side thereof for the convenience of changing the direction of fluid outlet during the maintenance operation. Two four-direction fixing rings 18 are arranged on the top and bottom of the circular lock 17 respectively so as to avoid the displacement caused by water pressure which could result in leaks.

Figure 4C:
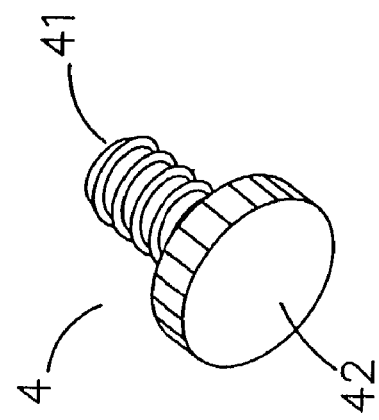
FIG. 4C is a perspective view of the ultraviolet-radiation indicator of the present invention.
Figure 4B:
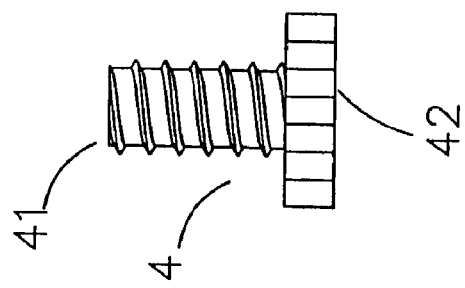
FIG. 4B is a lateral view of the ultraviolet-radiation indicator of the present invention.
Figure 4A:
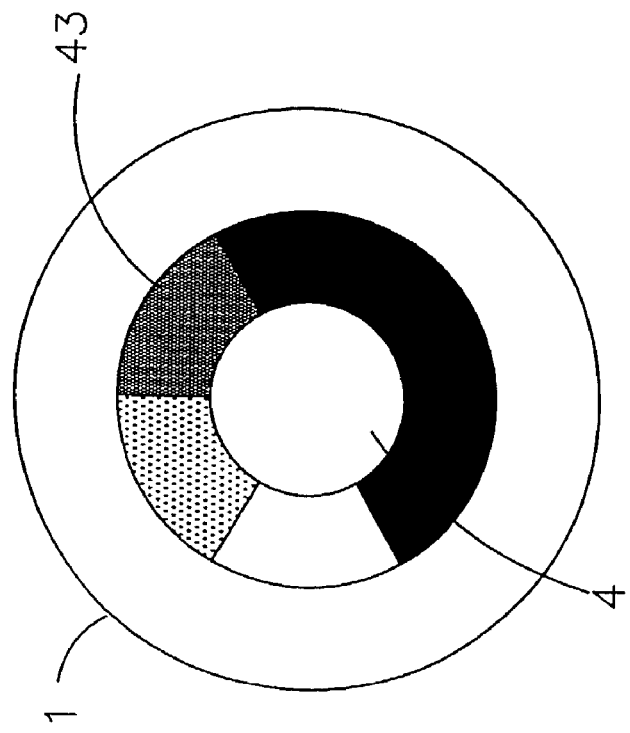
FIG. 4A is a schematic drawing of the bottom of an ultraviolet-radiation indicator when assembled.

Refer to FIG. 4A, FIG. 4B & FIG. 4C, an ultraviolet-radiation indicator 4 comprises an illuminated column 41 and an illuminant plane 42. The reactant inside the illuminated column 41 reacts with the ultraviolet light and emits the visible light, radiating from the illuminant plane 42. The reactant converting the ultraviolet light into the visible light is a fluorescent phosphor. With the reference of a color scale 43 with different shades of colors next to the ultraviolet-radiation indicator 4, users can know the intensity of the ultraviolet-radiation so as to avoid the loss of effectiveness of the present invention when the ultraviolet-radiation lamp 21 is old or damaged.

The present invention makes the fluid being processed blend properly so as to enhance the sterilization effect and the degradation effect of the organic pollutant inside the fluid as well as the reduction of the frequency of maintenance. Moreover, the fluid spinning at high speed flushes the outer wall of the quartz sleeve 2 making it unnecessary to clean the quartz sleeve 2 frequently.

It should be noted that the above description and accompanying drawings are only used to illustrate some embodiments of the present invention, not intended to limit the scope thereof. Any modification of the embodiments should fall within the scope of the present invention.

What is claimed is:

1. A turbine-boosted photocatalysis fluid processor, comprising:
    a tube unit that is coated with photocatalyst on an inner side thereof;
    a quartz sleeve installed inside of said tube unit;
    an ultraviolet-radiation lamp positioned inside the quartz sleeve;
    a fluid inlet tube and a fluid outlet tube positioned respectively at an upper end and a lower end of the tube unit;
    a speed-accelerating mechanism having a plurality of diversion channels positioned on one end of the fluid inlet tube, total area of a fluid outlet hole of the diversion channels being smaller than a cross-sectional area of a passage of the fluid inlet tube;
    a plurality of photocatalysis-enhancing devices positioned in parallel between the tube unit and the quartz sleeve; and
    an ultraviolet-radiation indicator positioned at an opening at a bottom of the tube unit for indicating an intensity of ultraviolet light.

2. The turbine-boosted photocatalysis fluid processor as claimed in claim 1, wherein a color scale with different shades of colors is installed beside the ultraviolet-radiation indicator.

3. The turbine-boosted photocatalysis fluid processor as claimed in claim 1, wherein each photocatalysis-enhancing device has a plurality of wires coated with photocatalyst, intercrossed to form a cylindroids.

4. The turbine-boosted photocatalysis fluid processor as claimed in claim 3, wherein each photocatalysis-enhancing device is a wire-mesh tube.

5. The turbine-boosted photocatalysis fluid processor as claimed in claim 3, wherein the photocatalysis-enhancing devices are parallel to the quartz sleeve, allowing fluid to flow at high speed between the quartz sleeve and the photocatalysis-enhancing devices, inside the photocatalysis-enhancing devices, as well as between the photocatalysis-enhancing devices and the tube unit.

6. The turbine-boosted photocatalysis fluid processor as claimed in claim 3, wherein each photocatalysis-enhancing device has an inner and an outer wire-mesh tube which are sealed on a top and a bottom side with granular carriers of photocatalyst therebetween.

7. The turbine-boosted photocatalysis fluid processor as claimed in claim 1, wherein each photocatalysis-enhancing device is coated with photocatalyst, allowing part of the ultraviolet light to penetrate and strike another one of the photocatalysis-enhancing devices, until the ultraviolet light hits an inner wall of the tube unit.

8. The turbine-boosted photocatalysis fluid processor as claimed in claim 1, wherein an inclination angle of the speed-accelerating mechanism is an angle between a center line of the quartz sleeve and the speed-accelerating mechanism, ranging from 91 to 179 degrees.

9. A turbine-boosted photocatalysis fluid processor, comprising a quartz sleeve installed inside a tube unit coated with photocatalyst on an inside the thereof, an ultraviolet-radiation lamp positioned inside the quartz sleeve, a fluid inlet tube and a fluid outlet tube positioned respectively at an upper and lower end of the tube unit; and an ultraviolet-radiation indicator for indicating an intensity of ultraviolet light positioned in an opening at a bottom of the tube unit.

10. The turbine-boosted photocatalysis fluid processor as claimed in claim 9, wherein a color scale with different shades of colors is installed beside the ultraviolet-radiation indicator.

11. The turbine-boosted photocatalysis fluid processor as claimed in claim 9, wherein the ultraviolet-radiation indicator is a screw body, an upper side being an illuminated column while another end being an illuminant plane.

12. The turbine-boosted photocatalysis fluid processor as claimed in claim 9, wherein the ultraviolet-radiation indicator is made of transparent material with a reagent which converts ultraviolet-radiation into visible light.

13. The turbine-boosted photocatalysis fluid processor as claimed in claim 12, wherein the reagent is a fluorescent phosphor.

* * * * *